United States Patent Office 2,865,497
Patented Dec. 23, 1958

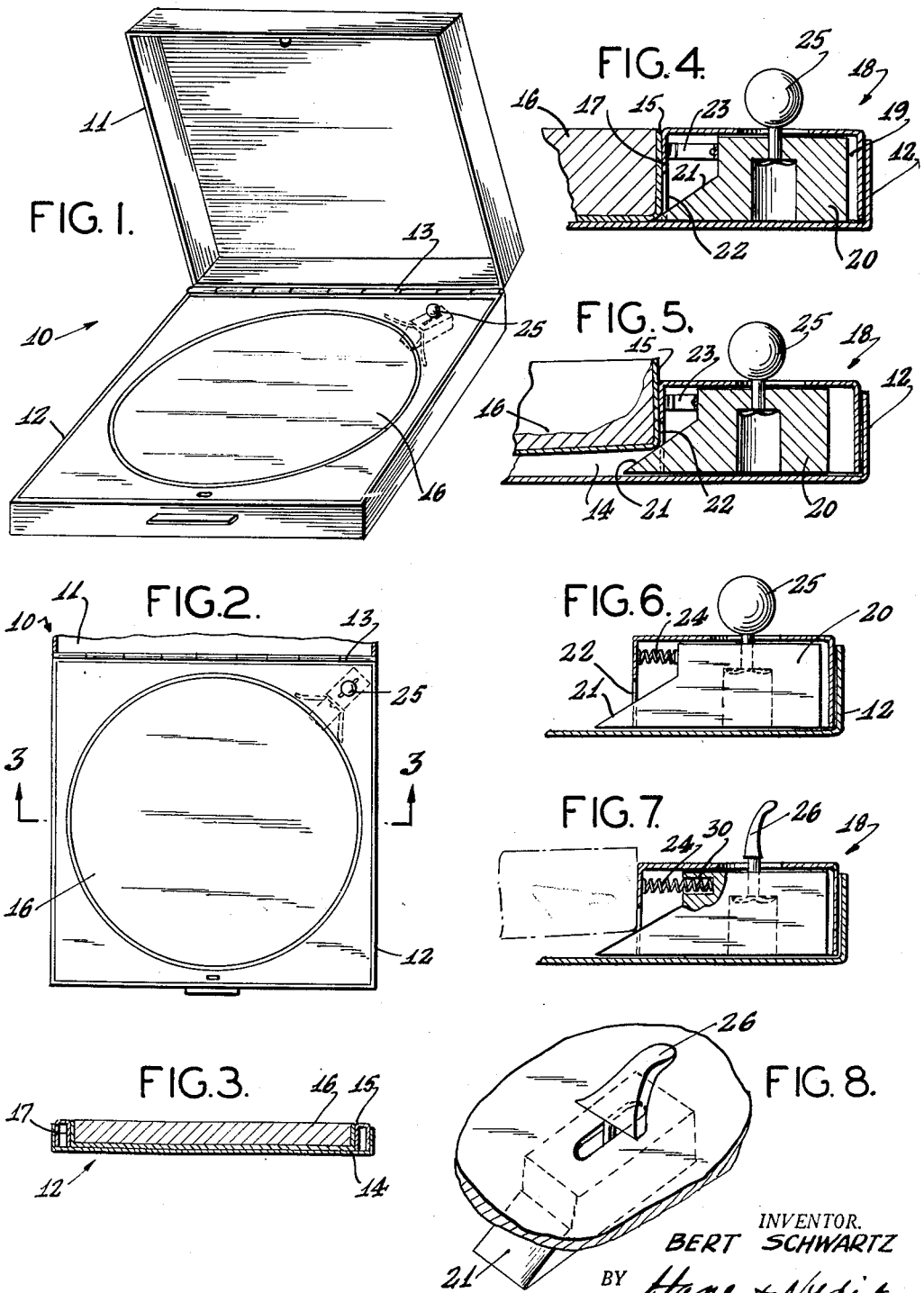

2,865,497

COMPACTS

Bert Schwartz, Croton-on-Hudson, N. Y., assignor to Hazel Bishop Inc., New York, N. Y., a corporation of New York Application December 5, 1955, Serial No. 551,080

4 Claims. (Cl. 206—37)

This invention relates to vanity cases, compacts, and the like, and more particularly is directed to a novel structure embodying means for dislodging emptied pans containing compressed make-up from devices of such character.

Compressed make-up composition familiarly known as pancake make-up, are carried in compacts. They may be contained in a pan set within a recess formed in the body of the compact. After the cake of make-up composition is consumed, the empty pan is removed from the compact and a refill substituted therefor. If the pan be snugly set within a recess of the compact, it is difficult to remove the emptied pan therefrom.

Accordingly, one of the primary objects of this invention is to provide a structure adapted snugly to engage a pan of the aforesaid cake make-up whereby the pan when the make-up is consumed may be easily dislodged from the compact.

Another important object of this invention is to provide a controlled means for dislodging emptied make-up pans from compacts.

Another object of this invention is to provide a means for dislodging emptied make-up pans from compacts which may be simply and easily operated.

In its fundamental aspect, the compact of this invention comprises a compact adapted to hold pancake make-up refills comprising a case having a recess or well for frictionally engaging a pan of make-up composition set within said recess, and a movable member adapted to move interiorly of said recess and beneath the base of said pan to dislodge same.

A fuller understanding of the invention and the manner in which its objectives and advantages may be realized will become apparent from the following detailed description thereof taken in connection with the accompanying drawings wherein:

Fig. 1 is a perspective view of an embodiment of the compact of this invention.

Fig. 2 is a plan view of the compact of Fig. 1.

Fig. 3 is a sectional view taken on line 3—3 of Fig. 2.

Fig. 4 is a sectional view of the movable member of the compact of Fig. 1 in restrained position.

Fig. 5 is a sectional view of the movable member of Fig. 1 in extended position.

Fig. 6 is a sectional view of a modified form of movable member in restrained position.

Fig. 7 is a sectional view of the movable member of Fig. 6 in extended position.

Fig. 8 is a perspective view of the movable member of Fig. 7 set within its housing.

Referring to the accompanying drawings in greater detail: The compact embodying the features of the present invention comprises a flattened case, designated generally by numeral 10, and consisting of a lid portion 11 and cosmetic carrying portion 12. The case is shown as being substantially square for purposes of illustration only. The two portions 11 and 12 are pivotally joined by a hinge 13, the opening and closing of the case being facilitated thereby.

As is evident in Fig. 3, cosmetic carrying portion 12 is formed to provide a recessed interior or well 14 for receiving pan 15 containing solidified make-up composition 16. The pan and receptacle, wherein it is set, are of the same shape, the respective sizes being such that the pan when inserted into the receptacle is snugly retained therein by frictional contact against the receptacle wall 17.

Dislodging unit 18, best seen in Figs. 4 through 8, is housed at the edge of the aforementioned receptacle and within the unrecessed section 19 of cosmetic carrying portion 12. The unit comprises a movable member 20 having an angular working face 21 projecting in the direction of the horizontal interface of the make-up pan and receptacle. An aperture 22 is formed in the receptacle wall 17 so that angular extension 21 may move into the well 14 and beneath the base of the make-up pan to dislodge same.

Normally, member 20 is restrained from moving through the aperture by biasing means such as leaf spring 23 of Fig. 4 or coil spring 24 of Fig. 6. When pressure is applied to handles 25 or 26 in the direction of the receptacle sufficient to overcome the resistance of the spring, the angular face is caused to move through the aperture and beneath the base of the make-up pan to dislodge same, as shown in Figs. 5 and 7. As shown in Fig. 7, member 20 may be provided with a bore 30 for housing a portion of spring 24.

It should be quite evident that the pancake make-up refills may be easily, quickly, and inexpensively mounted in and removed from the receptacle. This feature of simplicity in the insertion and removal of the refills constituting one of the features of the present invention, and makes it feasible to stock merchandise in pre-filled pans which may be placed in the compact easily and quickly, either by the manufacturer or the consumer.

While the invention has been described in detail with respect to several preferred embodiments thereof, it will be understood by those skilled in the art, after reading this specification, that various changes and modifications may be made without departing from the spirit of the invention and the scope of the appended claims.

What is claimed as new and desired to be secured by Letters Patent is:

1. A compact comprising, in combination, a case having a base portion defining a recess and a cover movably engaged with said base portion, a pan removably received within said recess and in frictional engagement with said recess defining portions of said case, said pan being adapted to contain a makeup composition, and actuating means acting between said case and said pan for dislodging said pan from frictional engagement with said case, said actuating means including an actuating member supported for reciprocating movement within the confines of said base and in proximity with said recess for selective engagement between said case and said pan, and operating means disposed completely within said case associated with said actuating means for selectively effecting said movement of said actuating member, said operating means including a manually operated handle disposed within the space intermediate said base portion and said cover when said cover is in closed relationship with said base portion.

2. A compact comprising, in combination, a case having a base portion defining a shallow recess adapted frictionally to receive a pan of makeup composition, a cover movably engaged with said base portion, and actuating means including an actuating member supported within the confines of said base and in proximity with said recess for selective movement into dislodging engagement with a pan disposed within said recess, said actuating means including operating means associated with said member for controlling the movement of said member relative to said base, said operating means being entirely disposed within said case, said base portion including a continuous outer wall and an apertured inner wall defining said recess, said actuating member being supported for longitudinal movement between said outer and inner walls, and said operating means being disposed within said case between said inner wall and said cover.

3. A compact as set forth in claim 2, wherein said operating means includes a manually operated handle disposed intermediate said inner wall and cover and extends through said inner wall of said base portion adjacent to said recess.

4. A compact as set forth in claim 3, wherein said actuating means further comprises spring means acting between said actuating means and the interior of said base portion, said spring means normally biasing said actuating means in a direction away from said recess.

References Cited in the file of this patent

UNITED STATES PATENTS

| | | |
|---|---|---|
| 1,428,430 | Gerojohn | Sept. 5, 1922 |
| 1,807,480 | Kendall | May 26, 1931 |
| 2,146,140 | Hannings | Feb. 7, 1939 |